United States Patent [19]

Baba

[11] Patent Number: 5,312,130
[45] Date of Patent: May 17, 1994

[54] LID OF AN AIR BAG DEVICE FOR USE IN A PASSENGER'S SEAT

[75] Inventor: Yoshiyuki Baba, Shiga, Japan

[73] Assignee: Takata Corporation, Japan

[21] Appl. No.: 983,710

[22] Filed: Dec. 1, 1992

[30] Foreign Application Priority Data

Dec. 17, 1991 [JP] Japan .................. 3-333415

[51] Int. Cl.⁵ .............................................. B60R 21/16
[52] U.S. Cl. .................................. 280/728 B; 280/732
[58] Field of Search ............ 280/728 R, 728 B, 728 A, 280/732, 743 R; 403/119, 291

[56] References Cited

U.S. PATENT DOCUMENTS

| | | | |
|---|---|---|---|
| 4,834,421 | 5/1989 | Korber et al. | 280/728 A |
| 4,895,389 | 1/1990 | Pack, Jr. | 280/728 B |
| 4,989,896 | 2/1991 | DiSalvo et al. | 280/728 B |

*Primary Examiner*—Margaret A. Focarino
*Assistant Examiner*—Peter English
*Attorney, Agent, or Firm*—Kanesaka & Takeuchi

[57] ABSTRACT

A lid for covering an opening in an instrument panel of an automobile for attaching an air bag device for use in a passenger's seat, in which the lid has extended portions for covering the circumferential edge of the opening in the front surface of the instrument panel, wherein a plurality of protrusions are disposed to the surface of the extended portions that covers the front surface along the circumferential edge of the opening in the instrument panel.

6 Claims, 4 Drawing Sheets

LID OF AN AIR BAG DEVICE FOR USE IN A PASSENGER'S SEAT

FIELD OF THE INVENTION

The present invention concerns a lid of an air bag device for use in a passenger's seat which is disposed to a vehicle and extends upon collision of the vehicle, for protecting a passenger on the passenger's seat.

DESCRIPTION OF THE PRIOR ART

In an air bag device for use in a passenger's seat of the existing type, an air bag and an inflator are mounted to a retaining case (, for example, container) and, a lid is further attached so as to cover the air bag. The lid is sometimes referred to also as a module cover, a cover door or a deployment door.

Upon collision of the vehicle, the inflator actuates to extend the air bag, and the lid emerges into a cabin by being pushed by the extending air bag, and the air bag extends largely into the cabin.

FIG. 8 is a cross sectional view illustrating a structure of an air bag device for use in a passenger's seat in the prior art. An air bag device 12 is mounted to an opening 14 disposed to an instrument panel 10 for attaching the air bag device 12 for use in the passenger's seat. The air bag device 12 for use in the passenger's seat comprises a container 16, an air bag 18 folded and contained in the container 16, an inflator (not-illustrated) attached to the container 16 for generating a gas when the vehicle experiences collision or the like thereby extending the air bag 18, and a lid 20 covering the front opening of the container 16.

Leg portions 22 protruding backward are disposed to the lid 20 and the lid 20 is connected with the container 16 by fixing the leg portions 22 to the container 16.

Extended portions 24 extend from the lid 20, and each of the extended portions 24 extends so as to cover the peripheral edge of the opening 14 of the instrument panel 10. A portion of the extended portion 24 that opposes the instrument panel 10 is appended with a non-woven fabric 26. The non-woven fabric 26 is used for preventing occurrence of abnormal sounds when the extended portion 24 is in sliding contact with the instrument panel 10.

In the air bag device for use in the passenger's seat in the prior art, since the non-woven fabric 26 is appended manually one by one to the extended portion 24, the manufacturing work has been inefficient which increases the manufacturing cost.

OBJECT AND SUMMARY OF THE INVENTION

An object of the present invention is to prevent abnormal sounds caused by the sliding contact of an extended portion.

Another object of the present invention is to prevent occurrence of abnormal sounds by a simple and inexpensive constitution.

A lid of an air bag device for use in a passenger's seat according to the present invention covers an opening of an instrument panel of an automobile for attaching the air bag device for use in the passenger's seat, in which the lid has extended portions covering the circumferential edge of the opening in the front surface of the instrument panel, wherein a plurality of protrusions are disposed to the surface of the extended portion which covers the front surface of the peripheral edge of the opening of the instrument panel.

In the lid according to the present invention, the protrusions are disposed to the extended portions. Since the protrusions are disposed in this way, the lid extended portion is brought into point-to-point contact with the instrument panel, thereby preventing occurrence of abnormal sounds caused by sliding contact between the extended portion and the instrument panel. Further, the protrusions can be molded integrally with the lid upon molding of the lid and can be formed easily.

In the present invention, it is no more necessary to append the non-woven fabric to the lid extended portion as in the prior art, so that manufacturing cost for the lid can be reduced remarkably.

PREFERRED EMBODIMENT

Description will now be made to preferred embodiments with reference to the drawings.

Figure 1:
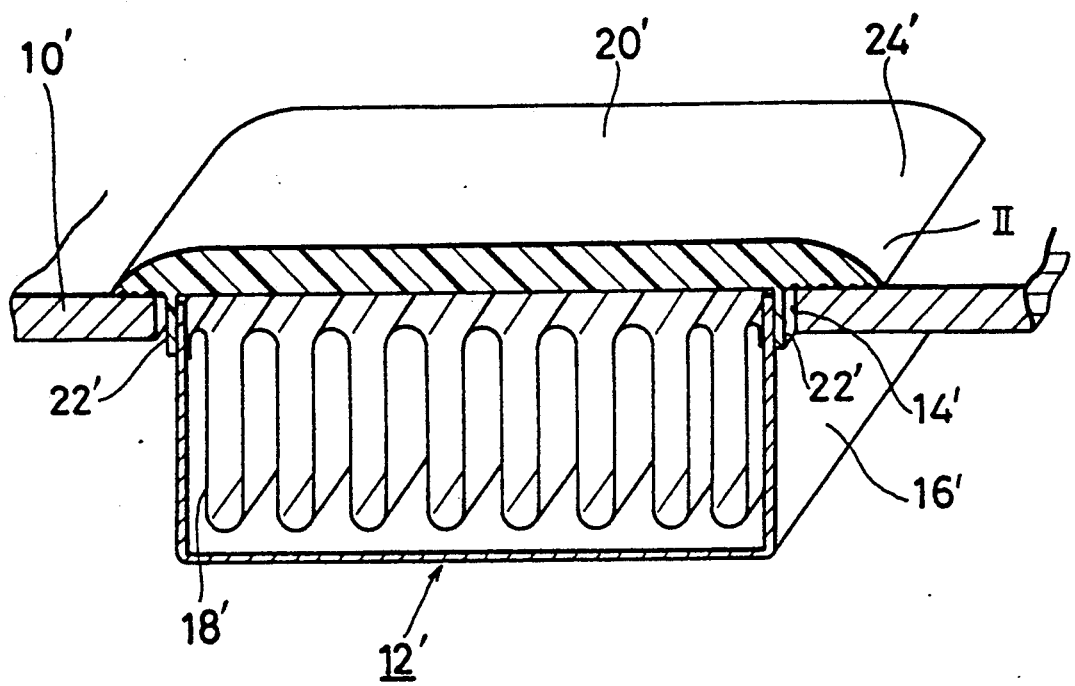
FIG. 1 is a cross sectional perspective view illustrating a structure for disposing an air bag device for use in a passenger's seat having a lid according to a preferred embodiment of the present invention.
Figure 2:
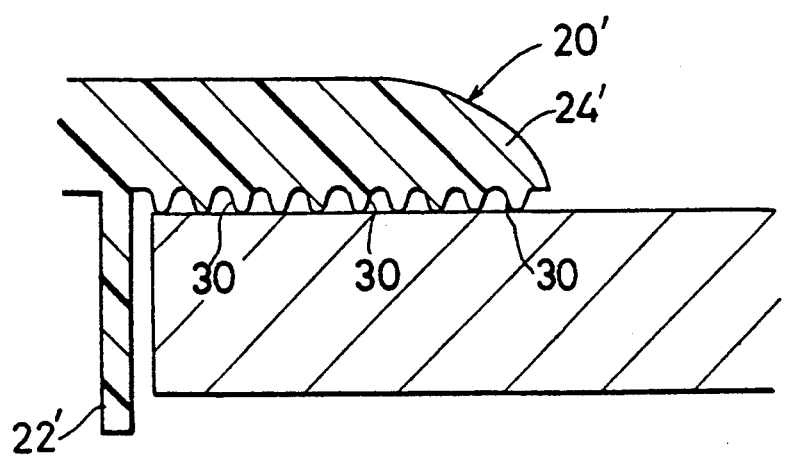
FIG. 2 is an enlarged cross sectional view for a portion II in FIG. 1.
Figure 3:
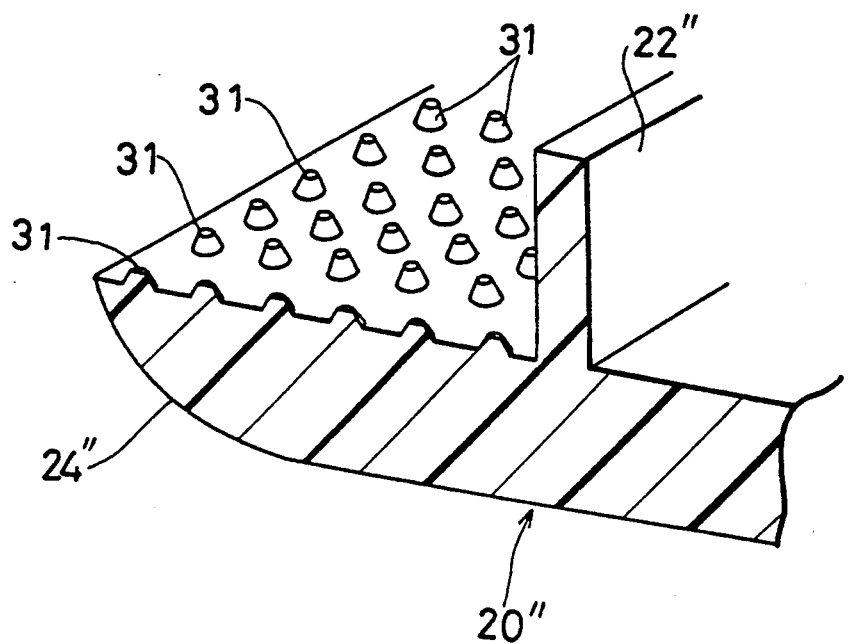
FIG. 3 is a perspective view of an extended portion illustrating an example for the shape of protrusions.

FIG. 1 is a cross sectional perspective view illustrating a structure for disposing an air bag device for use in a passenger's seat having a lid according to a preferred embodiment of the present invention and FIG. 2 is an enlarged cross sectional view for a portion II shown in FIG. 1.

In this embodiment, a plurality of protrusions 30 are disposed at a portion of each of extended portions 24' that oppose to an instrument panel 10'. By disposing the protrusions 30, the extended portion 24' and the instrument panel 10' are brought into point-to-point contact, so that occurrence of abnormal sounds upon sliding contact between the extended portion 24' and the instrument panel 10' is prevented.

The lid 20' is entirely made of a synthetic resin (a reinforcing material such as a mesh is inserted as required) and the protrusions 30 can be molded integrally with the lid 20' so that the manufacture is extremely easy. Further, it is no more necessary to append non-woven fabrics to the lid as in the prior art, so that manufacturing labor can be saved remarkably. In the drawings, are shown an air bag device 12', an opening 14', a container 16', an air bag 18', leg portions 22', 22", lids 20', 20", 20"' and extended portions 24', 24", 24"'.

Various shapes may be employed for the shape of the protrusions as shown in FIG. 3 to FIG. 7. The protrusion 31 shown in FIG. 3 has semi-ellipsoidal shape which is slightly cut into a flat shape at the top end.

Figure 4:
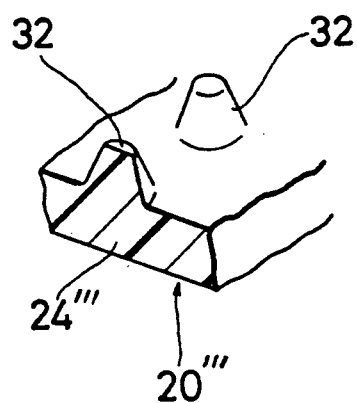
FIG. 4 is a perspective view illustrating an example for the shape of a protrusion.
Figure 5:
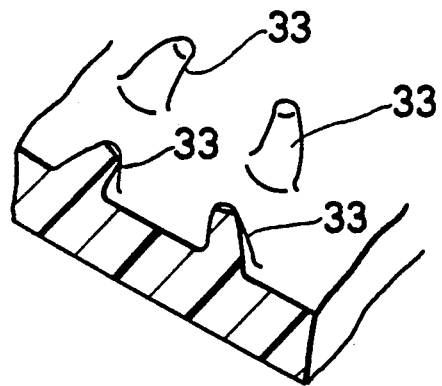
FIG. 5 is a perspective view illustrating an example for the shape of a protrusion.
Figure 6:
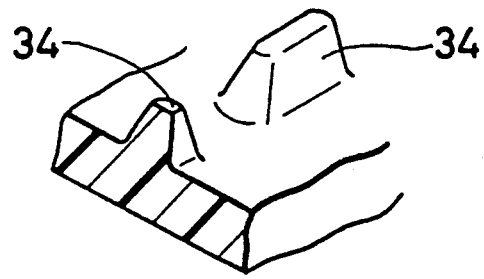
FIG. 6 is a perspective view illustrating an example for the shape of a protrusion.
Figure 7:
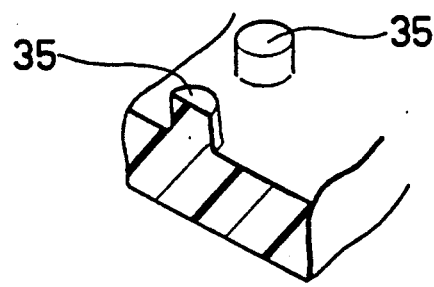
FIG. 7 is a perspective view illustrating an example for the shape of a protrusion.
Figure 8:
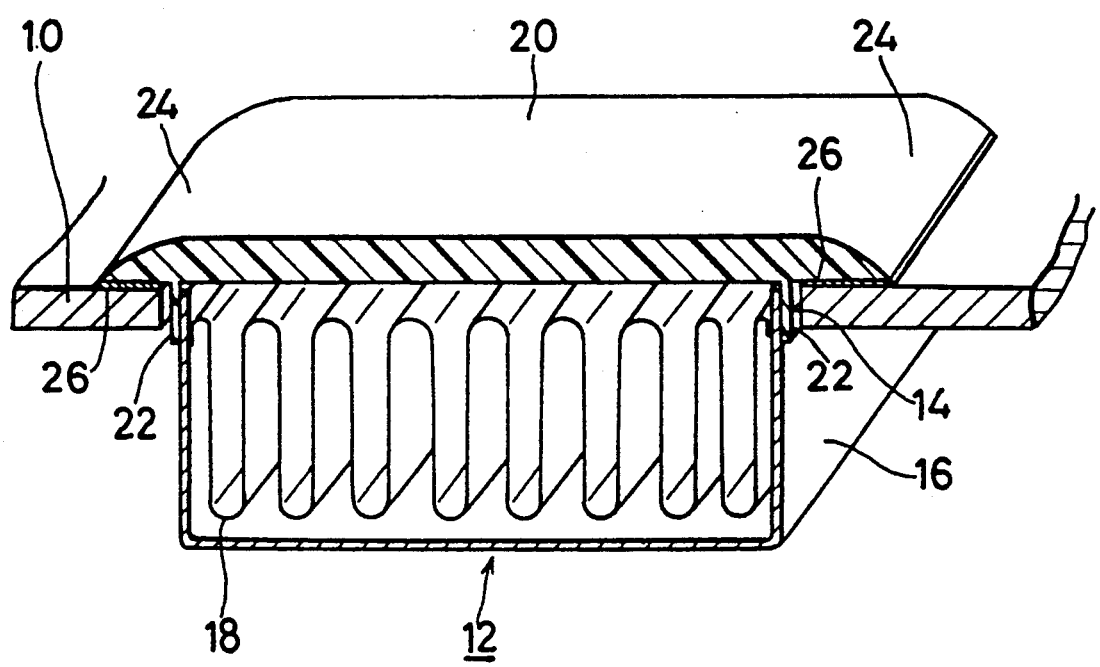
FIG. 8 is a cross sectional perspective view illustrating an air bag device for use in a passenger's seat in the prior art.

The protrusion 32 shown in FIG. 4 has a frustaconical shape. The protrusion 33 shown in FIG. 5 is formed by slightly slanting the protrusion shown in FIG. 4. The protrusion 34 shown in FIG. 6 has a trapezoidal shape formed by extending the protrusion shown in FIG. 4 in one direction and a protrusion 35 shown in FIG. 7 has a cylindrical shape.

It will be apparent that the protrusions shown in FIG. 3 to FIG. 7 are only examples that can be employed preferably in the present invention and protrusions of various shapes other than illustrated above may also be used in the present invention.

As has been described above, in the lid of the air bag device for use in the passenger's seat according to the present invention, protrusions are disposed to the extended portions so that occurrence of abnormal sounds upon sliding contact between the extended portions and the instrument panel may be prevented, by which it is no more necessary to append non-woven fabrics to the lid extended portions as in the prior art.

Further, the protrusions can be integrally molded easily with the lid. Therefore, the production cost of the lid according to the present invention can be reduced remarkably as compared with the lid in the prior art.

What is claimed is:

1. A lid covering an opening in an instrument panel of an automobile for attaching an air bag device for use in a passenger's seat comprising, an extended portion for covering a front surface of a peripheral edge of said opening in said instrument panel, and a multiplicity of protrusions disposed on an inner surface of said extended portion which covers the front surface of the peripheral edge of the opening, said protrusions having top ends and being arranged along a length of said extended portion in spaced intervals, said protrusions contacting at the top ends thereof with the front surface of the peripheral edge of the opening so as to inhibit contact of the entire inner surface of said extended portion with said front surface to thereby allow sliding contact between said extended portion and said front surface without occurrence of abnormal sound during sliding contact therebetween.

2. A lid as defined in claim 1, wherein the protrusions have a semi-ellipsoidal shape.

3. A lid as defined in claim 1, wherein the protrusions have a frustaconical shape.

4. A lid as defined in claim 3, wherein the protrusions are slightly slanted.

5. A lid as defined in claim 1, wherein the protrusions have a trapezoidal shape.

6. A lid as defined in claim 1, wherein the protrusions have a cylindrical shape.

* * * * *